(12) United States Patent
Middelesch et al.

(10) Patent No.: US 11,039,346 B2
(45) Date of Patent: Jun. 15, 2021

(54) HANDOVER OF A DEVICE WHICH USES ANOTHER DEVICE AS RELAY

(71) Applicants: Koninklijke KPN N.V., Rotterdam (NL); Nederlandse Organisatie voor Toegepast-Natuurwetenschappelijk Onderzoek TNO, s-Gravenhage (NL)

(72) Inventors: Erwin Willem Middelesch, The Hague (NL); Sander De Kievit, Tokyo (JP)

(73) Assignees: Koninklijke KPN N.V., Rotterdam (NL); Nederlandse Organisatie voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 16/347,371

(22) PCT Filed: Nov. 7, 2017

(86) PCT No.: PCT/EP2017/078380
§ 371 (c)(1),
(2) Date: May 3, 2019

(87) PCT Pub. No.: WO2018/083320
PCT Pub. Date: May 11, 2018

(65) Prior Publication Data
US 2019/0313248 A1 Oct. 10, 2019

(30) Foreign Application Priority Data
Nov. 7, 2016 (EP) ........................ 16197578

(51) Int. Cl.
*H04L 29/06* (2006.01)
*H04W 12/033* (2021.01)
(Continued)

(52) U.S. Cl.
CPC ..... *H04W 36/0038* (2013.01); *H04L 63/0272* (2013.01); *H04L 63/0428* (2013.01);
(Continued)

(58) Field of Classification Search
CPC . H04W 12/0013; H04W 92/18; H04W 36/08; H04W 36/0038; H04W 12/02; H04W 8/08; H04W 12/04; H04W 88/04; H04W 12/0401; H04L 63/0272; H04L 63/0428
See application file for complete search history.

(56) References Cited

U.S. PATENT DOCUMENTS

| 2012/0230244 | A1* | 9/2012 | Bienas | H04W 40/22 370/315 |
| 2016/0205555 | A1* | 7/2016 | Agiwal | H04W 12/0401 713/168 |
| 2016/0344726 | A1* | 11/2016 | Stojanovski | H04L 9/3247 |

FOREIGN PATENT DOCUMENTS

WO 2016/003750 A1 1/2016

OTHER PUBLICATIONS

PCT International Search Report and Written Opinion, PCT International Application No. PCT/EP2017/078380, dated Feb. 22, 2018, 10 pages.
(Continued)

*Primary Examiner* — Moo Jeong
(74) *Attorney, Agent, or Firm* — McDonald Boehnen Hulbert & Berghoff LLP

(57) ABSTRACT

A system (11) is configured to maintain a list of devices (1,9) associated with the system, wherein for each first device (1) of the list which uses a second device (9) of the list as a relay to the mobile communication network, the relation between the first device and the second device is recorded in the list and a security endpoint is recorded for the first device. The system is further configured to receive encrypted information from a device, determine from the list whether the device is used by a further device as a relay, forward the
(Continued)

encrypted information to a security endpoint associated with the further device upon determining that the device is used by the further device as a relay and the security endpoint is not the system, and decrypt the encrypted information upon determining that the device is not used by a further device as a relay.

15 Claims, 10 Drawing Sheets

(51) Int. Cl.
    *H04W 12/041*     (2021.01)
    *H04W 36/00*     (2009.01)
    *H04W 36/08*     (2009.01)
    *H04W 8/08*     (2009.01)
    *H04W 88/04*     (2009.01)
    *H04W 92/18*     (2009.01)

(52) U.S. Cl.
    CPC ........... *H04W 8/08* (2013.01); *H04W 12/033* (2021.01); *H04W 12/041* (2021.01); *H04W 36/08* (2013.01); *H04W 92/18* (2013.01); *H04W 88/04* (2013.01)

(56) References Cited

OTHER PUBLICATIONS

Huawei et al., "A Mutual Authentication and Session Key Generation Scheme Between Remote UE and Network aver the Relay", 3GPP Draft; S3-161695, vol. SA WG3, Nov. 7-11, 2016, 3 pages.

3GPP TR 33.899 V0.5.0, "3rd Generation Partnership Project; Technical Specification Group Services and System Aspects; Study on the Security Aspects of the Next Generation System (Release 14)" Oct. 2016. pp. 1-244.
European Search Report, European Patent Application No. 16197578. 4, dated Apr. 18, 2017, 5 pages.
3GPP TS 33.401 V13.4.0, "3rd Generation Partnership Project; Technical Specification Group Services and System Aspects; 3GPP System Architecture Evolution (SAE); Security Architecture (Release 13)", Sep. 2016, pp. 1-149.
3GPP TS 33.220 V6.4.0, "3rd Generation Partnership Project; Technical Specification Group Services and System Aspects; Generic Authentication Architecture (GAA); Generic Bootstrapping Architecture (Release 6)", Mar. 2005, pp. 1-38.
3GPP TR 33.899 V0.4.1, "3rd Generation Partnership Project; Technical Specification Group Services and System Aspects; Study on the Security Aspects of the Next Generation System (Release 14)", Aug. 2016, pp. 1-156.
3GPP TS 23.303 V13.5.0, "3rd Generation Partnership Project; Technical Specification Group Services and System Aspects; Proximity-Based Services (ProSe); Stage 2 (Release 13)", Sep. 2016, pp. 1-124.
3GPP TS 33.303 V13.4.0, "3rd Generation Partnership Project; Technical Specification Group Services and System Aspects; Proximity-Based Services (ProSe); Security Aspects (Release 13)", Jun. 2016, pp. 1-89.
3GPP TS 23.002 V14.0.0, "3rd Generation Partnership Project; Technical Specification Group Services and System Aspects; Network Architecture (Release 14)", Sep. 2016, pp. 1-113.
3GPP TS 23.401 V13.8.0, "3rd Generation Partnership Project; Technical Specification Group Services and System Aspects; General Packet Radio Service (GPRS) Enhancements for Evolved Universal Terrestrial Radio Access Network (E-UTRAN) Access (Release 13)", Sep. 2016, pp. 1-374.

\* cited by examiner

HANDOVER OF A DEVICE WHICH USES ANOTHER DEVICE AS RELAY

CROSS REFERENCE TO RELATED APPLICATIONS

The present application is a national stage entry of, and claims priority to, PCT/EP2017/078380, filed on Nov. 7, 2017, which claims priority to European Patent Application EP 16197578.4, filed in the European Patent Office on Nov. 7, 2016, both of which are hereby incorporated in their entirety herein by reference.

FIELD OF THE INVENTION

The invention relates to a system for receiving encrypted information in a mobile communication network.

The invention further relates to a method of receiving encrypted information in a mobile communication network.

The invention also relates to a computer program product enabling a computer system to perform such a method.

BACKGROUND OF THE INVENTION

The amount of devices that is able to connect to the Internet is expected to grow enormously, especially as a result of everyday objects having network connectivity. Not only do users communicate via Internet-connected devices, but devices also send data, e.g. sensor data or maps, to other devices (machine-to-machine communication) over the Internet. It is estimated that by the year 2020 50 billion devices will be connected. Therefore, it is no surprise that industry efforts and investments are directed towards this field.

The category of mobile devices, e.g. mobile phones, tablets, wearable devices and devices embedded in vehicles, is an important category of devices that is able to connect to the Internet. In order to e.g. reduce power consumption, it is advantageous to tether certain devices, e.g. wearable devices, to other devices, e.g. smart phones. When these certain devices do not trust these other devices, but do trust the mobile communication network to which these other devices are connected, protection of data between these certain devices and the mobile communication becomes important.

WO 2016/003750 discloses techniques for securely receiving critical communication content associated with a critical communication service. A secure connection from the critical communication service to remote user equipment (UE) may be established through a relay UE in order for the remote UE to securely receive critical communication content from the critical communication service. The remote UE and the critical communication service agree on common key material that can be used to securely relay a master session key, which may be for use by only the remote UE to decrypt encrypted critical communication content sent from the critical communication service and routed through the relay UE.

A drawback of these techniques is that each service requires the setup of an own end-to-end secure tunnel. A solution in which a secure tunnel between a remote UE and the mobile communication network may be used for multiple services is preferable. 3GPP TS 33.401 (v13.4.0; System Architecture Evolution (SAE); Security architecture) specifies how to setup a secure tunnel between a UE and an eNodeB in an LTE mobile communication network. This secure tunnel can be used for multiple services. However, 3GPP TS 33.401 does not specify how the secure tunnel can be maintained or re-established between a remote UE and an eNodeB in case of a handover, e.g. when a remote UE switches to another relay UE or when a relay UE used by a remote UE connects to another eNodeB.

SUMMARY OF THE INVENTION

It is a first object of the invention to provide a system for receiving encrypted information in a mobile communication network, which helps a device which uses another device as relay maintain or re-establish a secure tunnel after a handover without requiring the device to setup a secure tunnel with each service separately.

It is a second object of the invention to provide a method of receiving encrypted information in a mobile communication network, which helps a device which uses another device as relay maintain or re-establish a secure tunnel after a handover without requiring the device to setup a secure tunnel with each service separately.

According to the invention, the first object is realized in that the system for receiving encrypted information in a mobile communication network comprises a communication interface and at least one processor configured to maintain a list of one or more devices associated with said system in a memory, wherein for each first device of said list which uses a second device of said list as a relay to said mobile communication network, said relation between said first device and said second device is recorded in said list and a security endpoint is recorded for said first device in said list, further configured to use said communication interface to receive encrypted information from a device, further configured to determine from said list whether said device is used by a further device as a relay to said mobile communication network, further configured to use said communication interface to forward said encrypted information to a security endpoint associated with said further device if said device is used by said further device as a relay to said mobile communication network and said security endpoint is not said system, and further configured to decrypt said encrypted information if said device is not used by a further device as a relay to said mobile communication network. The system may comprise, for example, a base station, e.g. an LTE eNodeB.

The inventors have recognized that by using a single security endpoint (in the mobile communication network) for devices which use another device as relay, a secure tunnel does not need to be setup for each service separately, while the secure tunnel can be maintained after a handover, because the security endpoint does not need to be the system (e.g. the eNodeB) that the other device (e.g. the relay UE) is connected to. The inventors have recognized that for devices which do not use another device as relay, it is beneficial to setup a secure tunnel between the device (e.g. UE) and the system (e.g. eNodeB) directly, e.g. in accordance with 3GPP TS 33.401. As an additional advantage, since the device that uses another device as relay does not need to be involved in maintaining or re-establishing a secure tunnel, the overhead that would be caused by such an involvement is avoided, which is especially beneficial in case of small data transfer.

Said at least one processor may be configured to decrypt said encrypted information if said device is used by a further device as a relay to said mobile communication network and said system is associated as a security endpoint with said further device. This allows the system e.g. a base station, to be the security endpoint. As long as the device does not switch to a further device that is connected to a different base station and the further device does not connect to a different base station, no forwarding may be needed.

Said at least one processor may be configured to use said communication interface to connect (i.e. to connect directly, e.g. by establishing a wireless link) to a second device which is used by a first device as a relay, said second device previously connecting to a further system, and to record in said list said further system as said security endpoint for said first device. Said at least one processor may be configured to use said communication interface to receive a notification that a first device is using or wants to use a second device connected to said system as a relay and if said first device previously used a third device as a relay and said third device was connected to a further system, to record in said list said further system as said security endpoint for said first device.

When the system and the further system are base stations, base stations can be used as security endpoints and if no security endpoint has been associated with the first device yet, the base station with which the first device is already associated may be used as security endpoint so that that encrypted communication is forwarded to this base station. The first device may be associated with another base station than the base station that the second device that it uses as a relay is connected to and recorded in the list of this other base station when the first device uses a second device as relay that previously connected to this other base station or when the first device is using or previously used a third device as relay which was connected to this other base station, for example.

Said at least one processor may be configured to use said communication interface to receive information identifying a security endpoint, e.g. a serving gateway, and to record said security endpoint for one or more devices associated with said system in said list. For example, said at least one processor may be configured to use said communication interface to receive information identifying a certain serving gateway for further devices that use a device as a relay to said mobile communication network from a mobility management function. The same serving gateway may be used for all devices that use another device as relay, for example. If the base station, e.g. eNodeB, is not used as security endpoint for devices that use another device as relay, then it does not have to perform decryption as often and may be able to serve more devices.

According to the invention, the second object is realized in that the method of receiving encrypted information in a mobile communication network comprises maintaining a list of one or more devices associated with a system of a mobile communication network, wherein for each first device of said list which uses a second device of said list as a relay to said mobile communication network, said relation between said first device and said second device is recorded in said list and a security endpoint is recorded for said first device in said list, receiving at said system encrypted information from a device, determining from said list whether said device is used by a further device as a relay to said mobile communication network, forwarding said encrypted information to a security endpoint associated with said further device if said device is used by said further device as a relay to said mobile communication network and said security endpoint is not said system, and decrypting said encrypted information if said device is not used by a further device as a relay to said mobile communication network.

Said method may further comprise decrypting said encrypted information if said device is used by a further device as a relay to said mobile communication network and said system is associated as a security endpoint with said further device.

Said method may further comprise connecting to a second device which is used by a first device as a relay, said second device previously connecting to a further system, and recording in said list said further system as said security endpoint for said first device.

Said method may further comprise receiving a notification that a first device is using or wants to use a second device connected to said system as a relay and if said first device previously used a third device as a relay and said third device was connected to a further system, recording in said list said further system as said security endpoint for said first device.

Said method may further comprise receiving information identifying a security endpoint, e.g. a serving gateway, and recording said security endpoint for one or more devices associated with said system in said list.

Said method may further comprise receiving information identifying a certain serving gateway for further devices that use a device as a relay to said mobile communication network from a mobility management function.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: maintaining a list of one or more devices associated with a system of a mobile communication network, wherein for each first device of said list which uses a second device of said list as a relay to said mobile communication network, said relation between said first device and said second device is recorded in said list and a security endpoint is recorded for said first device in said list, receiving at said system encrypted information from a device, determining from said list whether said device is used by a further device as a relay to said mobile communication network, forwarding said encrypted information to a security endpoint associated with said further device if said device is used by said further device as a relay to said mobile communication network and said security endpoint is not said system, and decrypting said encrypted information if said device is not used by a further device as a relay to said mobile communication network.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java(™), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE DRAWINGS

Figure 1:
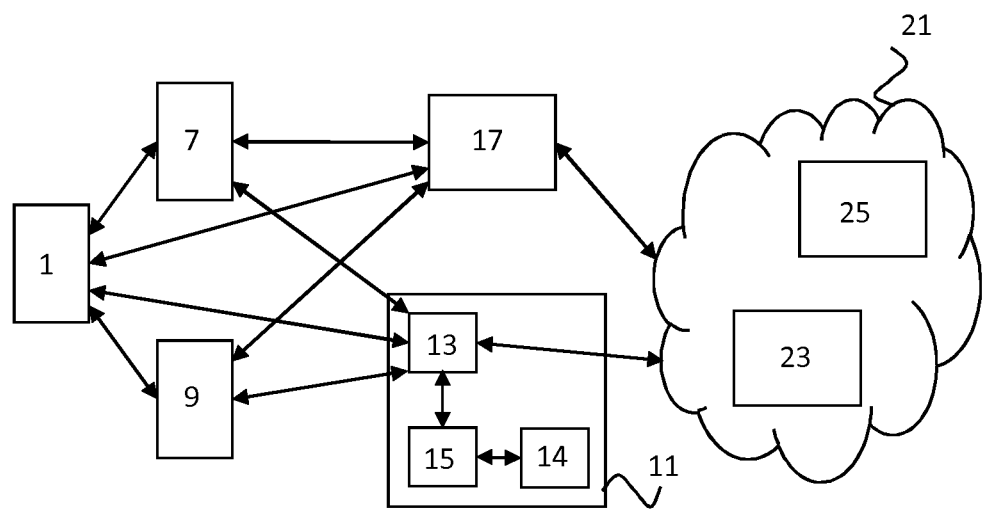
FIG. 1 is a block diagram of an embodiment of the system of the invention.

FIG. 1 shows a mobile device 1 (also referred to as remote UE in this description), devices 7 and 9 (also referred to as relay UEs in this description), which may relay the encrypted information for mobile device 1 to the mobile communication network, a first access point 17 and a second access point 11 (also referred to as eNBs in this description). Second access point 11 is an embodiment of a system for receiving encrypted information in a mobile communication network. First access point 17 may be an embodiment of the system for receiving encrypted information in a mobile communication network as well. First access point 17 and second access point 11 are nodes of the mobile communication network and are connected to the Core Network 21. The Core Network 21 comprises a mobility management function (e.g. an LTE MME) 25 and a serving gateway (e.g. an LTE S-GW) 23, amongst others.

The second access point 11 comprises a communication interface 13 and a processor 15. The processor 15 is configured to maintain a list of one or more devices associated with the system in a memory 14, wherein for each first device of the list which uses a second device of the list as a relay to the mobile communication network, the relation between the first device and the second device is recorded in the list and a security endpoint is recorded for the first device in the list. The processor 15 is further configured to use the communication interface 13 to receive encrypted information from the device 9, determine from the list whether the device 9 is used by a further device, e.g. the mobile device 1, as a relay to the mobile communication network, to use the communication interface 13 to forward the encrypted information to a security endpoint associated with the mobile device 1 upon determining that the device 9 is used by the mobile device 1 as a relay to the mobile communication network and the security endpoint is not the second access point 11, and to decrypt the encrypted information upon determining that the device 9 is not used by a further device as a relay to the mobile communication network.

The mobile device 1 may be, for example, a wearable device like virtual reality glasses, a smart watch, augmented reality glasses, earphones, a hearing aid, a glucose sensor, a body temperature sensor, a blood pressure sensor, an insulin pump, a heart rate sensor, a GPS sensor or an accelerometer. Alternatively, the mobile device 1 may be, for example, a car that connects to the mobile device of the driver. The mobile device 1 may also be a device that the user may carry, use or interact with only occasionally and is connected to his/her mobile device only occasionally, e.g. a game console, a wireless toy, a wireless keyboard, a tablet, a screen, a beamer, or a musical instrument. The devices 7 and 9 may each be a smart phone, a laptop or a tablet, for example. The devices 7 and 9 may each have a slot for a UICC (also called a SIM card) or be provisioned with an embedded or enhanced version thereof for storage of credentials, for example.

In the embodiment shown in FIG. 1, the second access point 11 comprises one processor 15. In an alternative embodiment, the second access point 11 comprises multiple processors. In the embodiment shown in FIG. 1, the memory 14 is part of the second access point 11. In an alternative embodiment, the memory 14 is part of another device.

The communication interface 13 of the second access point 11 may use WiFi, Ethernet or one or more cellular communication technologies such as GPRS, CDMA, UMTS and/or LTE to communicate with the mobile device 1 and the further devices 7 and 9, for example. The processor 15 is preferably a general-purpose processor, e.g. an Intel or an AMD processor. The processor 15 may comprise multiple cores, for example. The processor 15 may run a Unix-based or Windows operating system, for example. The second access point 11 may comprise other components typical for a component in a mobile communication network, e.g. a power supply and a random access memory. The memory 14 may comprise solid state memory, e.g. one or more Solid State Disks (SSDs) made out of Flash memory, and/or one or more hard disks, for example.

In a first embodiment of the second access point 11, the processor 15 is configured to decrypt the encrypted information upon determining that the device 9 is used by the mobile device 1 as a relay to the mobile communication network and the second access point 11 is associated as a security endpoint with the mobile device 1. The processor 15 may be configured to use the communication interface 13 to connect to the device 9, which is used by the mobile device 1 as a relay, the device 9 previously connecting to a first access point 17, and to record in the list the first access point 17 as the security endpoint for the mobile device 1. The processor 15 may be configured to use the communication interface 13 to receive a notification that the mobile device 1 is using or wants to use the device 9 connected to the second access point 11 as a relay and if the mobile device 1 previously used a device 7 as a relay and the device 7 was connected to a first access point 17, to record in the list the first access point system 17 as the security endpoint for the mobile device 1.

In a second embodiment of the second access point 11, the processor 15 is configured to use the communication interface 13 to receive information identifying a security endpoint and to record the security endpoint for one or more devices associated with the second access point 11 in the list. The security endpoint may comprise a serving gateway 23. The processor 15 may be configured to use the communication interface 13 to receive information from a mobility management function 25 identifying the serving gateway 23 for further devices, including mobile device 1, that use device 9 as a relay to the mobile communication network (and possibly for all further devices that use any device as a relay).

Figure 2:
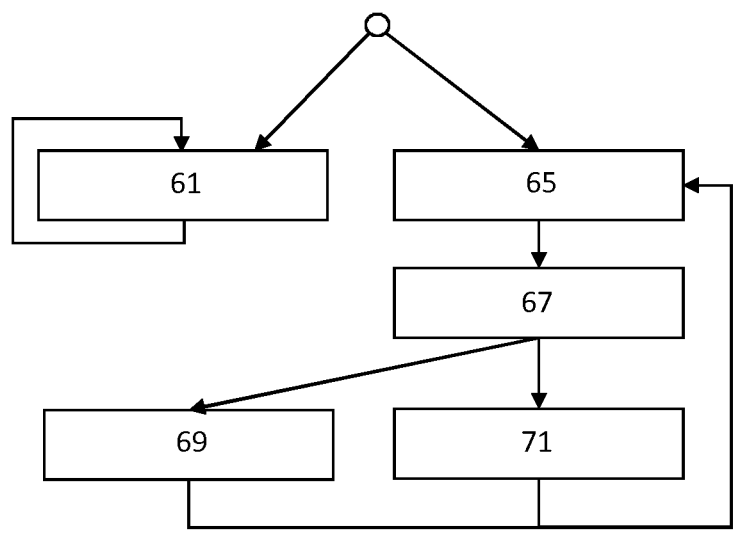
FIG. 2 is a flow diagram of a first embodiment of the method of receiving encrypted information in a mobile communication network of the invention.

A flow diagram of a first embodiment of the method of receiving encrypted information in a mobile communication network of the invention is shown in FIG. 2. A step 61 comprising maintaining a list of one or more devices associated with a system of a mobile communication network, wherein for each first device of the list which uses a second device of the list as a relay to the mobile communication network, the relation between the first device and the second device is recorded in the list and a security endpoint is recorded for the first device in the list. In parallel, a step 65 comprises receiving at the system encrypted information from a device.

A step 67 comprises determining from the list whether the device is used by a further device as a relay to the mobile communication network. A step 69 comprises forwarding the encrypted information to a security endpoint associated with the further device upon determining that the device is used by the further device as a relay to the mobile communication network and the security endpoint is not the system. Alternatively, a step 71 may be performed. Step 71 comprises decrypting the encrypted information upon determining that the device is not used by a further device as a relay to the mobile communication network. After step 69 or step 71 has been performed, the method proceeds to step 65 again.

Figure 3:
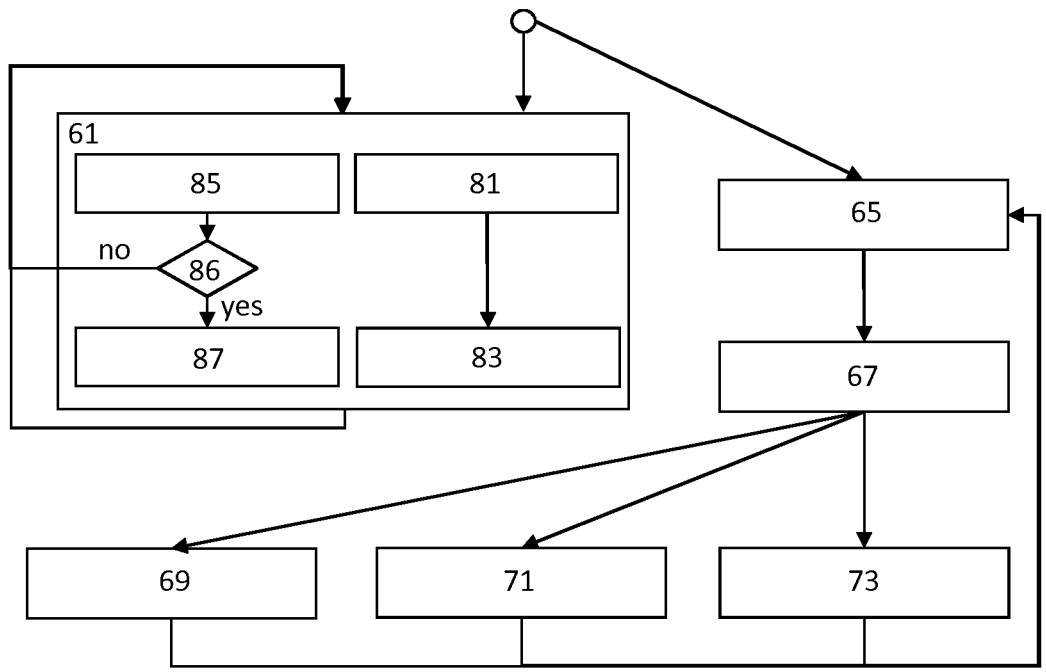
FIG. 3 is a flow diagram of a second embodiment of the method of receiving encrypted information in a mobile communication network.

A flow diagram of a second embodiment of the method of receiving encrypted information in a mobile communication network is shown in FIG. 3. In the second embodiment, an additional step 73 comprises decrypting the encrypted information upon determining that the device is used by a further device as a relay to the mobile communication network and the system is associated as a security endpoint with the further device. Step 73 is an alternative to steps 69 and 71. After step 69, step 71 or step 73 has been performed, the method proceeds to step 65 again.

In the second embodiment, step 61 comprises a step 81 of connecting to a second device which is used by a first device as a relay, the second device previously connecting to a further system, and a step 83 of recording in the list the further system as the security endpoint for the first device. Step 61 further comprises a step 85 of receiving a notification that a first device is using or wants to use a second device connected to the system as a relay. Upon determining in decision point 86 that the first device previously used a third device as a relay and the third device was connected to a further system, a step 87 of recording in the list the further system as the security endpoint for the first device is performed.

Figure 4:
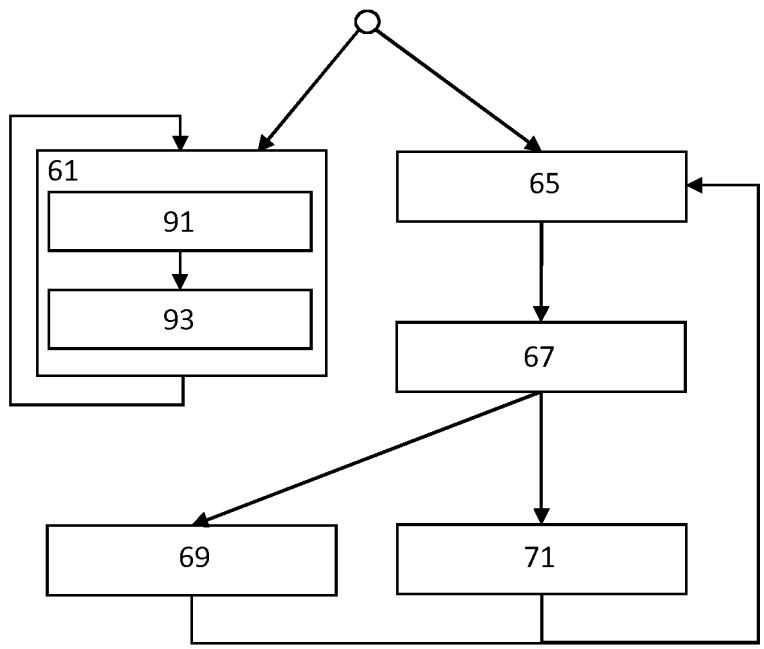
FIG. 4 is a flow diagram of a third embodiment of the method of receiving encrypted information in a mobile communication network.

A flow diagram of a third embodiment of the method of receiving encrypted information in a mobile communication network is shown in FIG. 4. In the third embodiment, step 61 comprises a step 91 of receiving information identifying a security endpoint and a step 93 of recording the security endpoint for one or more devices associated with the system in the list. The security endpoint may comprise a serving gateway, for example. In particular, step 91 may comprise receiving information identifying a certain serving gateway for further devices that use a device as a relay to the mobile communication network from a mobility management function.

The invention is explained in more detail with the help of FIGS. 5 to 11. Although the provided examples are based on the LTE standard and refer to LTE components, the invention may also be used in other cellular communication networks and with similar components of those networks.

Figure 5:
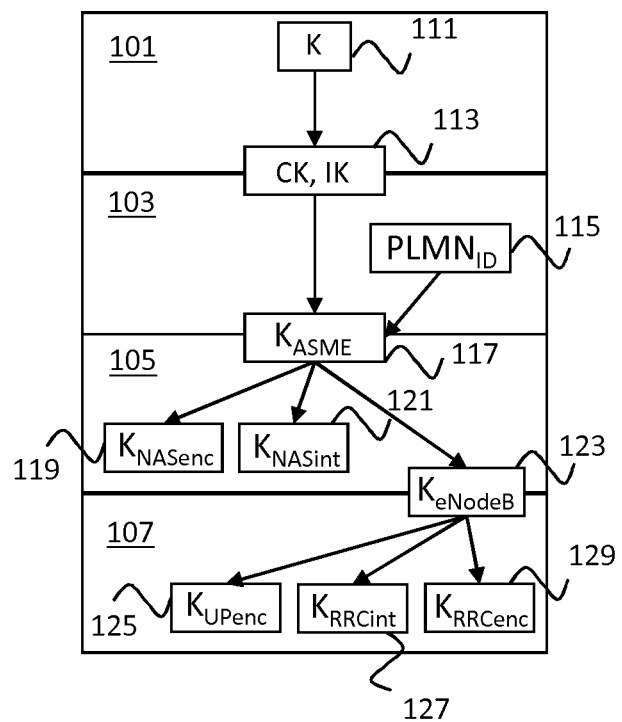
FIG. 5 shows keys used in an LTE mobile communication network.

FIG. 5 shows keys used for encryption between UE and eNB in LTE. RRC and NAS signaling may be encrypted using RRC and NAS keys, respectively. For user plane encryption, a KUP key may be used.

All key derivations described hereinafter are performed using the following formula (specified in 3GPP TS 33.220): derived key=HMAC-SHA-256 (Key, S).

For brevity, the formula is also denoted as "KDF (Key, S)". The string S is built up from several components, one being an FC-value to separate the key derivations. Also, the String S often contains lengths (denoted Ln) in addition to the value itself. So, a string is constructed, for example, from the following values:

FC=1
P0=KPN
P1=TNO-NL
L0=3
L1=6

The final string S is given by: S=FC||P0||L0||P1||L1=1KPN3TNO-NL6. Hereinafter, Len will refer to any Ln value and concatenation is denoted by '||' or '/'.

The key derivations in LTE work as follows for initial attach (specified in 3GPP TS 33.401):

USIM and AuC (Authentication Center) derive CK, IK 113 from K 111 (using for example the Milenage algorithm) in block 101.

UE and HSS derive $K_{ASME}$ 117 from CK, IK 113 and the Serving Network ID (PLMNID) 115 in block 103. $K_{ASME}$=KDF(CK||IK, FC||SN_id||Len||SQON XOR AK||Len).

UE and MME derive the NAS Keys ($K_{NASenc}$ 119 and $K_{NASInt}$ 121), an $K_{eNodeB}$ key 123 and an NH key (not shown) from $K_{ASME}$ 117 in block 105. $K_{eNodeB}$=KDF ($K_{ASME}$, FC||NAS Count||Len). NH=KDF ($K_{eNodeB}$, FC||KeNodeB/NH||Len).

UE and eNodeB derive the user plane key $K_{UPenc}$ 125 and the RRC keys ($K_{RRCint}$ 127 and $K_{RRCenc}$ 129) from $K_{eNodeB}$ in block 107.

Key derivations for $K_{eNodeB}$ are specified in 3GPP TS 33.401. 3GPP TR 33.899 v0.4.1 specifies options for key hierarchies. 3GPP TR 33.899 v0.5.0 specifies security requirements for relay security, in particular to being able to protect sessions and uniquely identify the remote UE, which are enabled by the present invention by deriving appropriate keys and using these keys to protect the session.

Ciphering on the link between the eNB and the UE may be used to prevent UE tracking based on cell level measurement reports, handover message mapping, or cell level identity chaining. Another reason to provide ciphering for the link between the eNB and the UE is to (optionally) protect the user plane.

Figure 6:
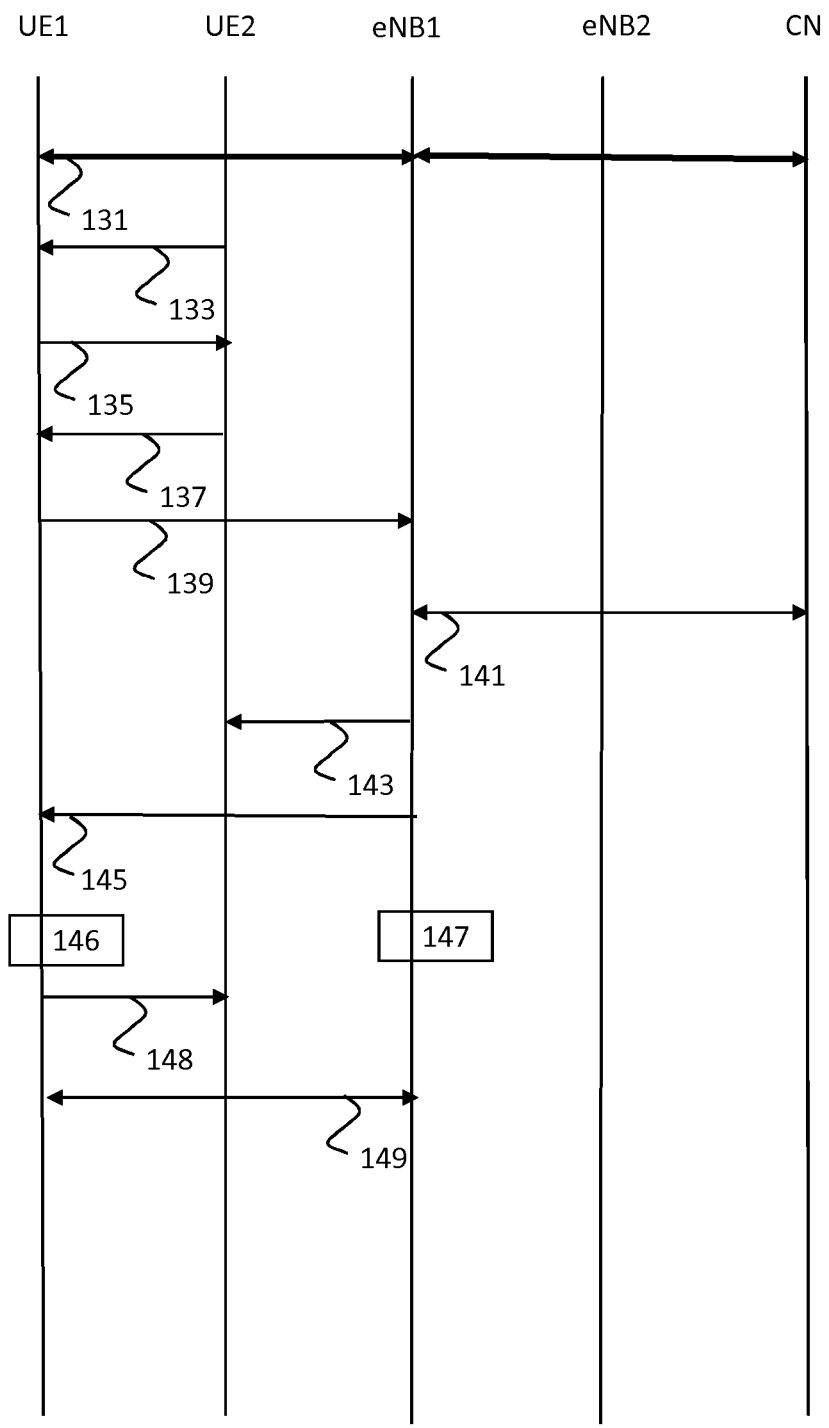
FIG. 6 is a flow diagram showing a first example of a device starting to use a further device as a relay in a first embodiment of the method.

The following situations are considered as hand overs:
a) Switching between direct and relayed mode for the remote UE
b) Handing over the relay UE and the remote UE together
c) Hand over between relay UEs by the remote UE Situation a) is depicted in FIG. 6 as an example of the first embodiment. In step 131, UE1 attaches to the Core Network (CN) via eNB1 in the normal way. In step 133, UE1 discovers a new relay (UE2) based on ProSe (Proximity Services) discovery. ProSe specifies that one of the UEs may broadcast and one of the UEs is listening and so either UE could be the broadcasting UE. Step 133 may involve UE2 transmitting such a broadcast message or a series of messages to UE1. The broadcast message could be directed to UE1 only, meaning that it could be addressed to UE1 and be visible for everyone to see or that it could be protected by some encryption or obfuscation technique that allows only UE1 to learn its contents. Ultimately, in case UE1 and UE2 are already on the same network, for example a local area network, the broadcast could be exchanged over the alternative network. Also, the broadcast message could be exchanged on an alternative radio network, such as short range networks like WiFi and Bluetooth. The method of message exchange does not matter as long as the message(s) exchanged between UE1 and UE2 contain(s) information that allows UE1 to learn that UE2 is a possible relay, by either exposing its capabilities, group memberships or by broadcasting a known identifier. In case UE1 would broadcast, it would ask for a relay and UE2 could simply answer by saying 'yes'. Also note that the discovering UE may send a match report to the ProSe Function in order to determine whether the broadcast received is a relevant discovery. Alternatively, if UE1 is broadcasting, UE2 could reply to the broadcast and so the 'broadcast' (step 133) and 'connect' (step 135) arrows change direction. Proximity Services is specified in 3GPP TS 23.303 and TS 33.303.

In step 135, UE1 connects to UE2 (it is assumed that UE2 asks for relay resources from the network and obtains these relay resources from the network). In step 137, UE2 confirms to UE1 that the connection has been established. If the direction of the arrow (i.e. of the broadcast) is reversed in step 133, the direction of the arrows may need to be reversed in steps 135 and 137 as well.

In step 139, UE1 asks eNB1 for a handover to UE2. Normally, the network is in charge of handovers, so UE may not be able to literally ask for a handover. Instead, it could send a 'relay discovered' message or it could send a measurement report which includes the signal from UE2 as measurement. Also, a message could be used in which UE1 literally sends a 'please handover to discovered relay UE2' message. Lastly, the handover could be initiated by the network after a ProSe match report was received from UE1 or UE2. In that case, step 139 could be performed by the network instead.

In step 141, eNB1 starts a search to find out who UE2 is. (1) One solution is that UE2 has told UE1 its radio identifier when they connected and UE1 may have included the radio identifier. (2) Another option is that UE1 forwards the ProSe identifier of UE2 and that the eNB does a lookup of the identifier via the Core Network. (3) The eNB may also try to page UE2 based on the identifier it got from UE1. (4) Yet another alternative is that UE2 forwards the handover request to eNB1 including its GUTI/TMSI or C-RNTI or even a bearer identifier of the bearer to be switched. In case step 139 is performed by the network, the eNB may still will have to make a mapping between the identifiers known in the Core Network and the identifiers known to the Core Network, or alternatively, the Core Network will have to map between the different identifiers of ProSe and EPS bearer identities in order to identify the respective eNBs that the UEs are connected to and inform the respective eNB (eNB1 in this case) of the findings.

eNB1 may also find out that UE2 is connected to another eNB. This is described in relation to FIG. 7. In the flow diagram shown in FIG. 6, UE2 is also connected to eNB1. Once eNB1 has found out who UE2 is, it will assign new radio resources to UE2 and assign a DRB ID (Data Radio Bearer Identifier) to the bearer for those radio resources. It will also tell UE2 that these radio resources are for relay of data from UE1 in an RRC message in step 143. The new radio bearer(s) for UE1 traffic that are set up between eNB1 and UE2 may use 'NULL' encryption or may be unencrypted bearers. Also, eNB1 may specify that no integrity protection is necessary. Instead, integrity protection for the RRC or UP (if used) may be provided by UE1.

UE1 then switches to UE2 relay in step 148 upon receiving a command thereto from the eNB1 in step 145. New keys are derived by UE1 and eNB in steps 146 and 147 (in this example before switching to UE2) as follows: $K_{eNB}^*$=KDF ($K_{eNB}$, FC||Cell ID||Len||EARFCN_DL||Len).

UE1 establishes a PC-5 bearer between UE1 and UE2 in step 149. UE2 forwards traffic between the PC-5 bearer and the radio bearer for UE1. If there is no one-to-one relation between PC-5 bearers and radio bearers, UE1 will have to indicate to UE2 for which bearer the traffic is meant. UE2 will then have to inspect each packet that it receives over the PC-5 bearer (possibly reassemble packets) and forward them to the correct radio bearer. In return, UE2 will have to keep UE1 informed about possible packet counters and retransmissions which may affect the counters (and therefore, the encryption).

Figure 7:
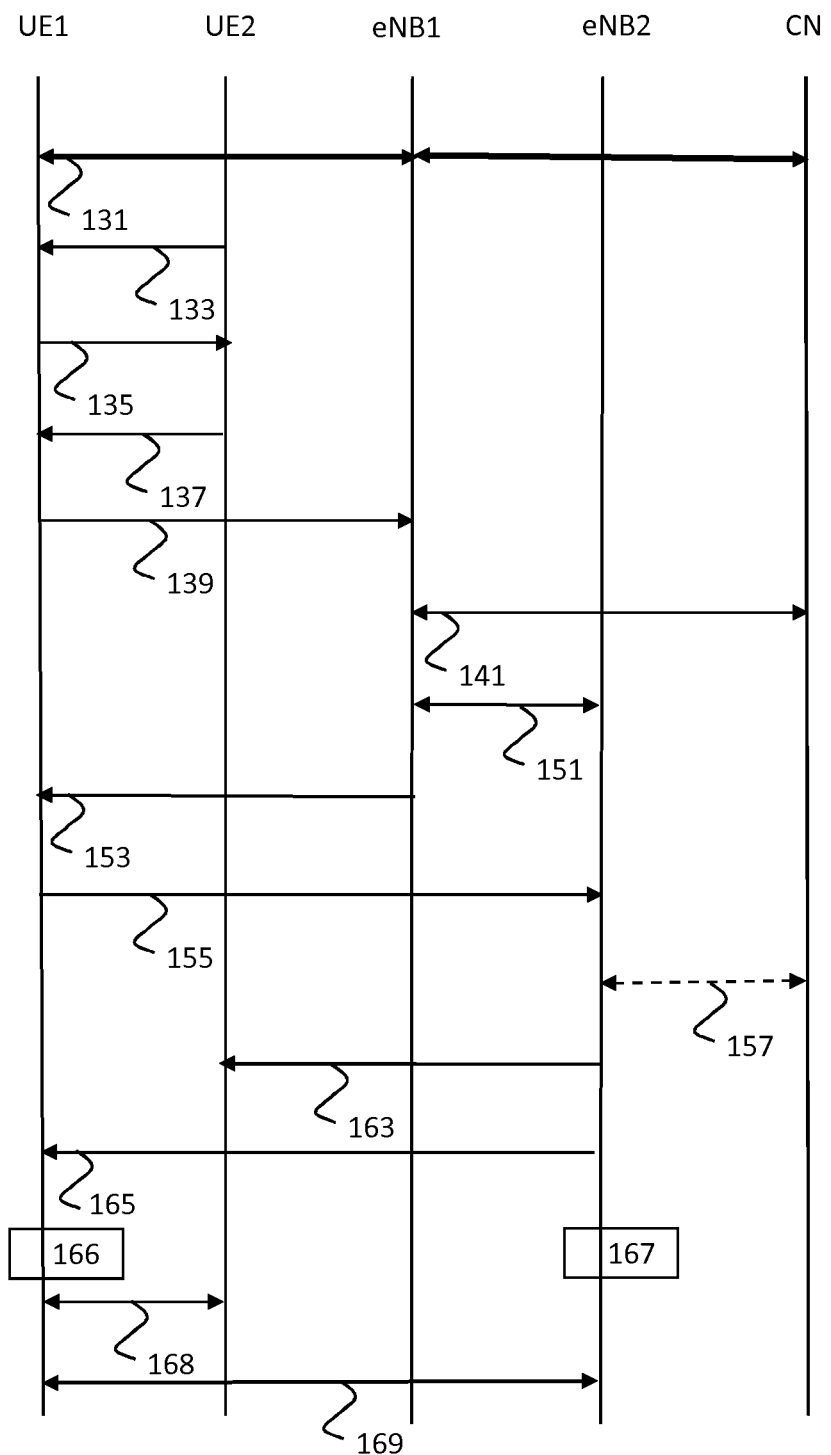
FIG. 7 is a flow diagram showing a second example of a device starting to use a further device as a relay in the first embodiment of the method.

FIG. 7 shows what would change in the example of FIG. 6 when eNB1 finds out in step 141 that UE2 is connected to another eNB, eNB2 in this case. eNB1 now initiates a handover of UE1 to eNB2 in step 151 and optionally provides eNB2 with the information that it had just obtained about the switched UE1. Next, UE1 is informed in step 153 by eNB1 that it should connect to eNB2 to request the handover to UE2. In step 155, UE1 connects to eNB2 and requests the handover to UE2. If eNB2 did not receive information about who UE2 is from eNB1 in step 151, it finds out in step 157. Steps 163 to 169 correspond to steps 143 to 149 of FIG. 6, but the role of eNB1 is now assumed by eNB2.

Figure 8:
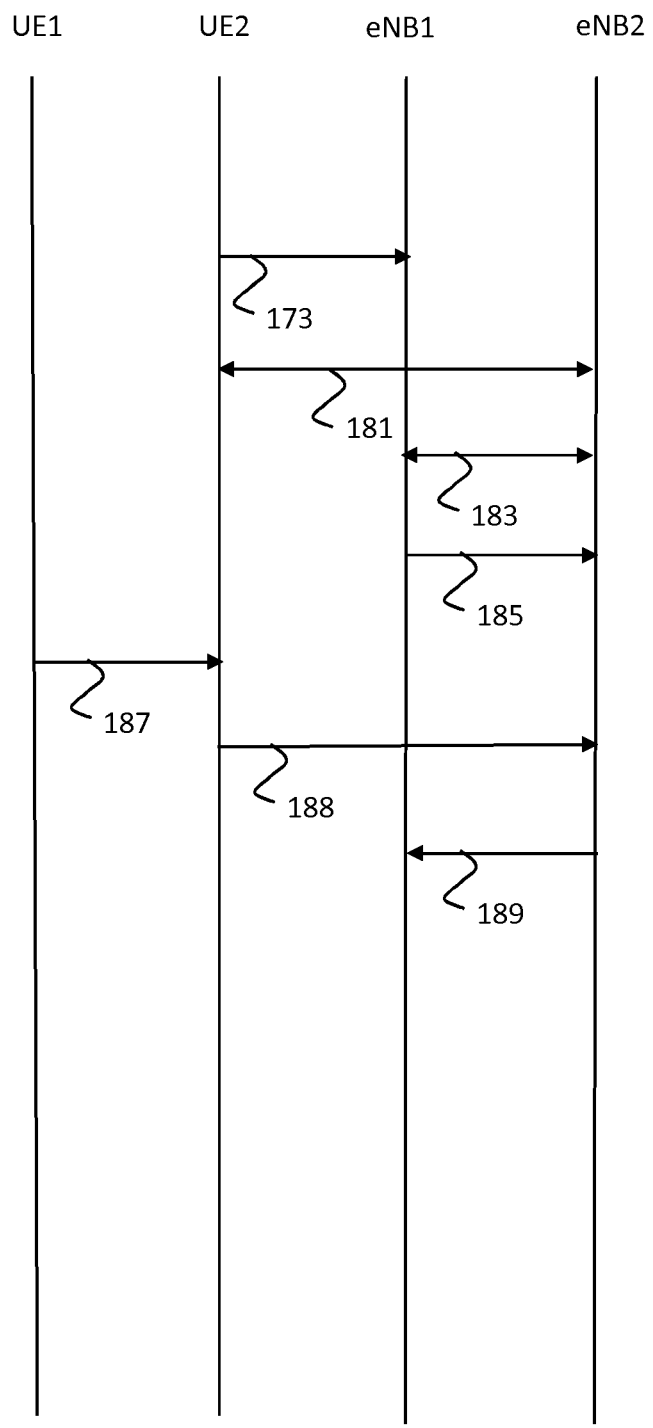
FIG. 8 is a flow diagram showing an example of the further device of FIG. 6 being handed over to another base station.

Situation b) is depicted in FIG. 8 for an example of the first embodiment. UE2 is connected to eNB1, as shown in FIG. 6.

In step 173, UE2 signals eNB1 the need for a handover. UE2 may do this using measurement reports and eNB1 may finally issue the command to handover. In step 181, UE2 and eNB2 arrange the handover of UE2 from eNB1 to eNB2. In step 183, eNB1 and eNB2 arrange the handover of UE1 from eNB1 to eNB2. UE1 is not informed of the handover. In step 185, eNB1 informs eNB2 that eNB2 should forward encrypted information originating from UE1 to eNB1. This allows eNB1 to decrypt the encrypted information, route the decrypted information to a further network node in the Access, Core Network or further packet network in case the termination point of the information is not eNB1 itself, and encrypt information received from a further node in the network that is meant to be received by UE1 (now shown in FIG. 8). An example of such a further node is a Serving Gateway (S-GW), for example for user plane traffic, a mobility management function or entity for signaling and small data transfer or even another eNB, for example eNB2, for radio resource control signaling.

In step 187, UE1 transmits encrypted information to UE2. In step 188, UE2 relays the received encrypted information to eNB2, to which UE2 is currently connected. In Step 189, eNB2 forwards the encrypted information to eNB1 (the security endpoint), to which UE2 was previously connected. No new keys need to be derived.

Figure 9:
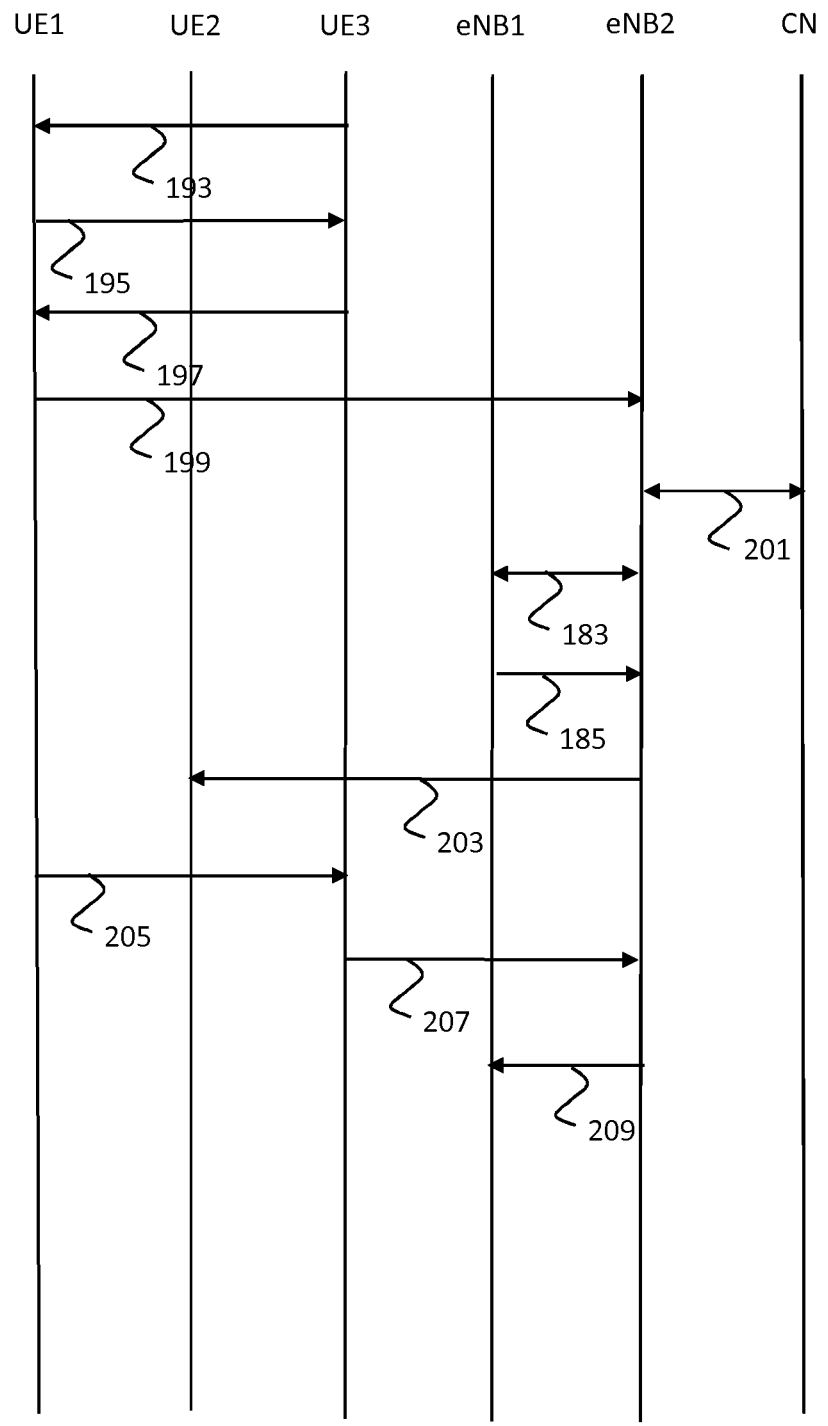
FIG. 9 is a flow diagram showing an example of the device of FIG. 6 starting to use another device as a relay instead of the further device.

Situation c) is depicted in FIG. 9 as an example of the first embodiment. Steps 193 to 201 are similar to steps 133 to 141 of FIG. 6, but now it is UE3 instead of UE2 that UE1 requests to use as a relay and UE3 is connected to eNB2 instead of to eNB1. UE1 previously used UE2 (which was connected to eNB1) as a relay, but UE2 may now be out of range of UE1 or UE2 may no longer be available, e.g. switched off or in flight mode.

When eNB2 finds out in step 201 that UE1 is associated with eNB1, because UE1 previously used UE2 as relay and UE2 was connected to eNB1, eNB2 and eNB1 arrange the handover of UE1 to eNB2 in step 183. However, eNB1 remains the security endpoint for UE1. In step 185, eNB1 informs eNB2 that eNB2 should forward encrypted information originating from UE1 to eNB1. This allows eNB1 to decrypt the encrypted information, route the decrypted information to a further network node in the Access, Core Network or further packet network in case the termination point of the information is not eNB1 itself, and encrypt information received from a further node in the network that is meant to be received by UE1 (not shown in FIG. 9). An example of such a further node is a Serving Gateway (S-GW), for example for user plane traffic, a mobility management function or entity for signaling and small data transfer or even another eNB, for example eNB2, for radio resource control signaling.

In step 203, UE2 is informed that UE1 is gone so that it may clean up its resources. In step 205, UE1 transmits encrypted information to UE3. In step 207, UE3 relays the received encrypted information to eNB2, to which UE3 is connected. In Step 209, eNB2 forwards the encrypted information to eNB1, to which UE2 was connected when UE1 used UE2 as relay. No new keys need to be derived.

Figure 10:
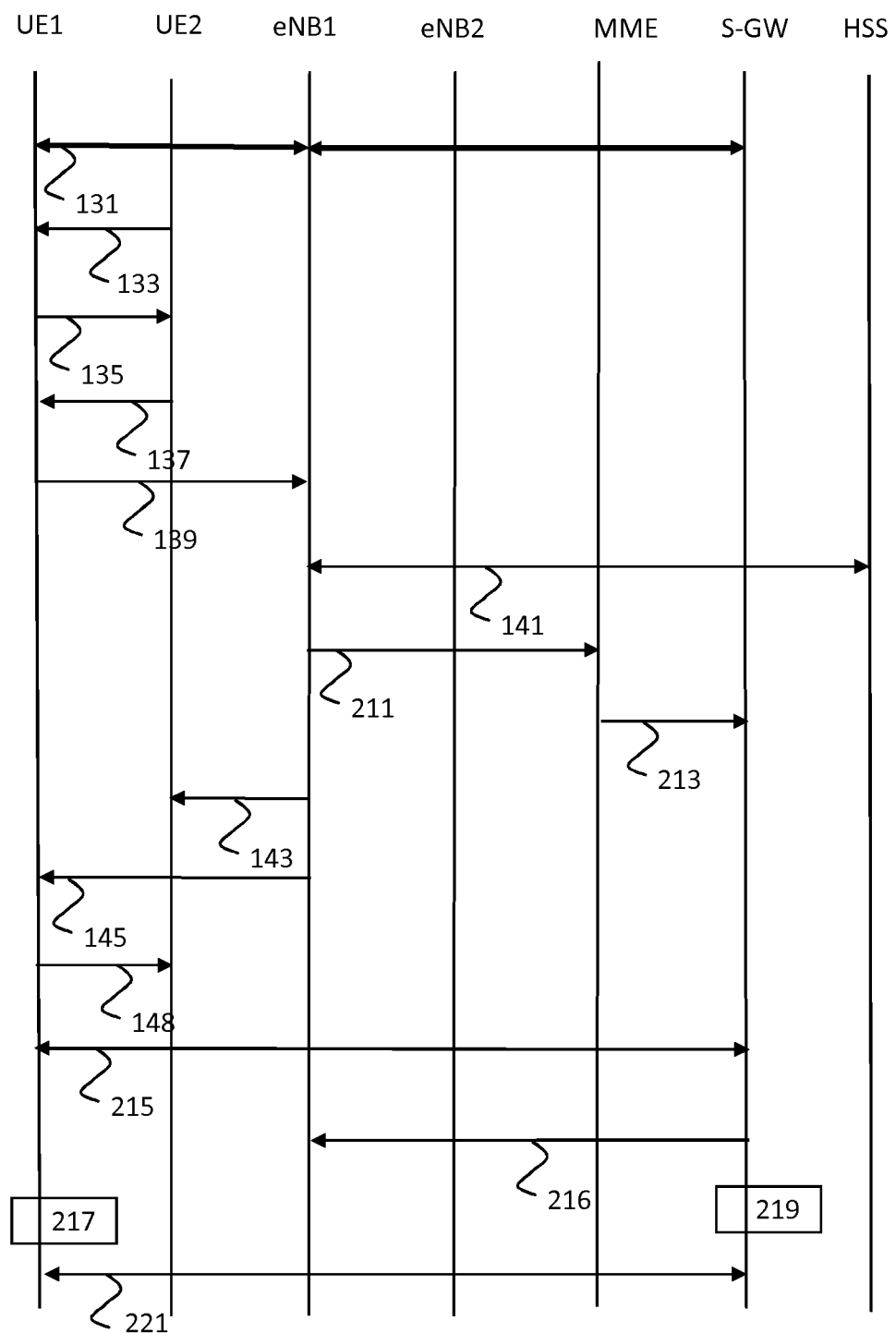
FIG. 10 is a flow diagram showing an example of a device starting to use a further device as a relay in a second embodiment of the method.

Situation a) is depicted in FIG. 10 as an example of the second embodiment. In this second embodiment, a specific S-GW is used for the remote UEs. In this way, no $K_{eNB}$ is necessary, but a newly introduced $K_{SGW}$. In this second embodiment, the user plane is encrypted and not the radio channel.

In step 131, UE1 attaches to the network. During the attach procedure, the MME recognizes UE1 as a potential remote UE (for example, the subscription profile indicates that it is a low-power device) and so, the MME selects a specific S-GW for remote UEs. This specific S-GW should be security enhanced so that it can handle security contexts.

In step 133, UE1 discovers a relay, UE2, e.g. using Proximity Services. In Step 135, UE1 connects to UE2. In Step 137, UE2 confirms to UE1 that the connection has been established. In step 139, UE1 asks eNB1 for a handover to UE2. For the radio resource allocation, the eNB1 finds out who UE2 is in step 141, so that it knows how to allocate the radio resources. At the same time, eNB1 informs the MME in step 211 of the fact that UE1 has requested to be relayed through UE2. In step 213, the MME informs the S-GW of the pending hand over.

Once eNB1 has found out who UE2 is, it will assign new radio resources to UE2 and assign a DRB ID (Data Radio Bearer Identifier) to the bearer for those radio resources. It will also tell UE2 that these radio resources are for relay of data from UE1 in an RRC message in step 143. The new radio bearer(s) for UE1 traffic that are set up between eNB1 and UE2 may use 'NULL' encryption or may be unencrypted bearers. Also, eNB1 may specify that no integrity protection is necessary. Instead, integrity protection for the RRC or UP (if used) may be provided by UE1. UE1 then switches to UE2 in step 148 upon receiving a command thereto from the eNB1 in step 145.

The S-GW and UE1 now start a security negotiation in step 215, during which they agree on:
Which algorithm(s) is/are used.
Key derivation input parameters, which could be for example two randoms (nonces) agreed by the UE and the S-GW. If no negotiation is preferred, it could be the NAS Counter.

Alternatively, the role of the S-GW in step 215 could also be assumed by the MME, which may, after having derived the key, forward the key to the S-GW. Alternatively, eNB1 forwards the key it has to the S-GW, no negotiation is necessary. The key may then be derived using an incrementing counter or something alike.

At the end of the security negotiation of step 215, the S-GW sends back a 'secure mode command' to UE1 to start encrypting and/or integrity protecting the user plane with the newly agreed key and algorithms. The S-GW also informs the eNB1 in step 216 that the security context between the UE1 and the S-GW has been established.

In steps 217 and 219, the UE1 and S-GW derive their respective keys. As described in relation to step 215, the following key derivations may be used, for example: $K_{SGW}*=KDF(K_{ASME}, FC\|NONCE\_SGW\|Len\|NONCE\_UE\|Len)$, $K_{SGW}*=KDF(K_{ASME}, FC\|Counter\|Len)$ or $K_{SGW}*=KDF(K_{eNB}, FC\|"S\_GW"\|Len\|NONCE\_SGW\|Len)$. In step 221, a secure tunnel is established between the S-GW and UE1. The signaling between eNB1 and UE1 is done by signaling to UE2.

Figure 11:
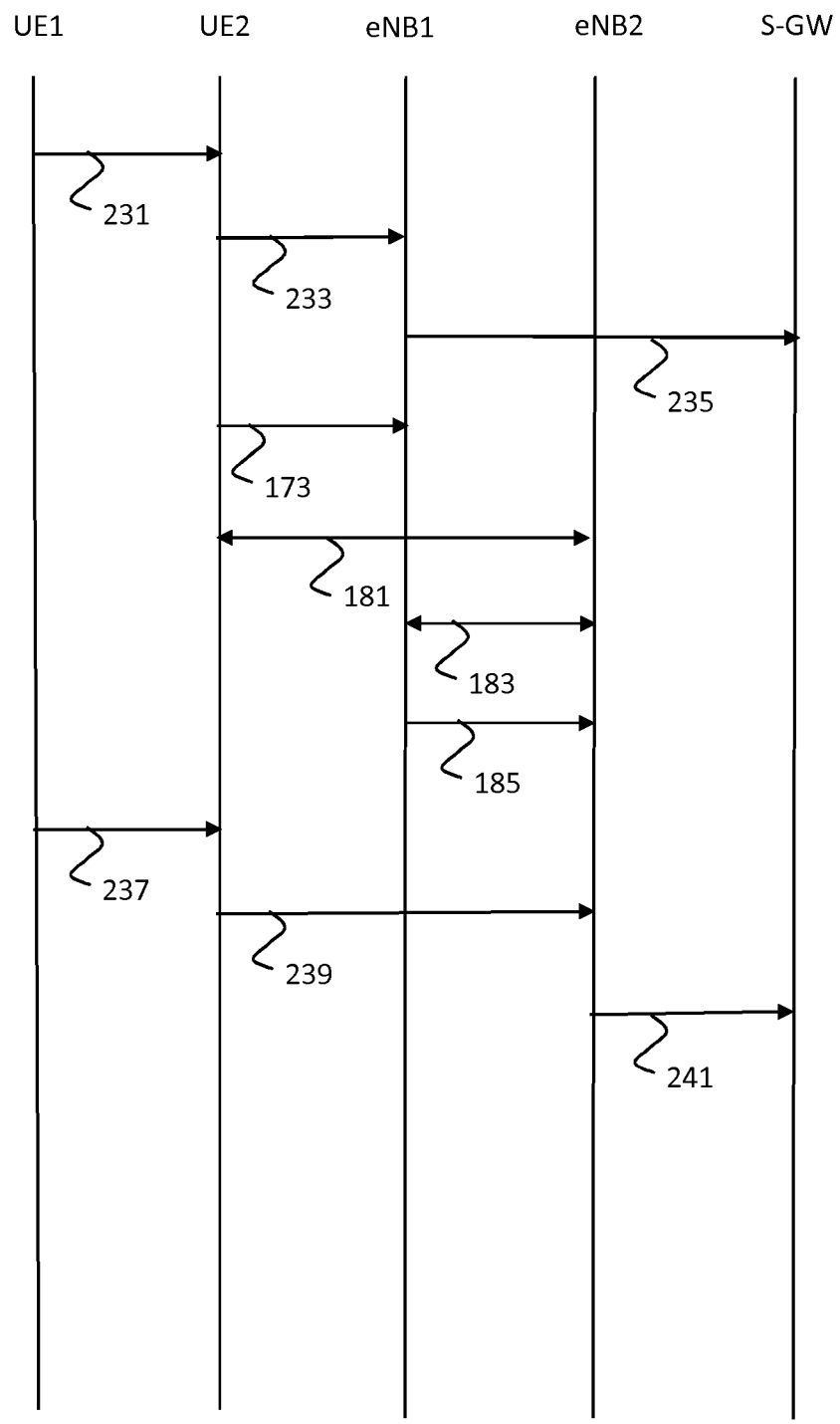
FIG. 11 is a flow diagram showing an example of the further device of FIG. 10 being handed over to another base station.

Situation b) is depicted in FIG. 11 as an example of the second embodiment. UE2 is connected to eNB1, as shown in FIG. 10.

In step 231, UE1 transmits encrypted information to UE2. In step 233, UE2 relays the received encrypted information to eNB1, to which UE2 is currently connected. In Step 235, eNB1 forwards the encrypted information to the S-GW (the security endpoint).

In step 173, UE2 signals eNB1 the need for a handover. UE2 may do this using measurement reports and eNB1 may finally issue the command to handover. In step 181, UE2 and eNB2 arrange the handover of UE2 from eNB1 to eNB2. In step 183, eNB1 and eNB2 arrange the handover of UE1 from eNB1 to eNB2. UE1 is not informed of the handover. In step 185, eNB1 informs eNB2 that eNB2 should forward encrypted information originating from UE1 to the S-GW. This allows the S-GW to decrypt the encrypted information and route the decrypted information to a further network node in the Access, Core Network or further packet network in case the termination point of the information is not S-GW itself, and encrypt information received from a further node in the network that is meant to be received by UE1 (not shown in FIG. 11). An example of such a further node is a Packet Gateway, for example for user plane traffic. Another example of such a node is a MME or a node in the Access Network, such as an eNB. Even though the S-GW sits in the user plane, the embodiment includes the possibility to exchange signaling messages between nodes in the Core or Access Network and the UE1 via the encrypted user plane between the UE1 and the S-GW, for example by setting a flag in each message that indicates whether the message is user or control plane. The advantage of such an implementation would be that no further derivation of air interface keys may be required and no further signaling keys are required; another advantage is that the relaying UE (UE2) has only one endpoint to direct the communication of UE1 to, namely the specified S-GW. Such a design would therefore be simple to implement. In the examples mentioned above, some signaling traffic goes via the user plane; similarly, it would be possible to send some user data via the control plane in case the role of the S-GW in this embodiment is assumed by a signaling entity, for example a Mobility Management Function in the Core Network or an MME in LTE.

In step 237, UE1 transmits encrypted information to UE2. In step 239, UE2 relays the received encrypted information to eNB2, to which UE2 is currently connected. In Step 241, eNB2 forwards the encrypted information to the S-GW (the security endpoint). No new keys need to be derived.

Advantageously, this embodiment enables a situation where the UE1 may temporarily be unavailable because it goes into some sort of battery saving mode. For example, in case that UE1 is a smartwatch and UE2 is a smartphone, the two UEs may assume that for most of the day they will remain in close proximity. As such, they may set a reasonable time interval of for example 5 minutes where they exchange a message to check that the other UE is still there. In the case that UE1 would like to send data, it is only required to check that the UE2 (or another associated UE) is proximity and available for data transfer. The UE1 does not need to exchange further signaling with the network, for example because no mobility management is necessary, and can use the stored security context (the $K_{SGW}$ and other keys) to protect the data straight away.

Figure 12:
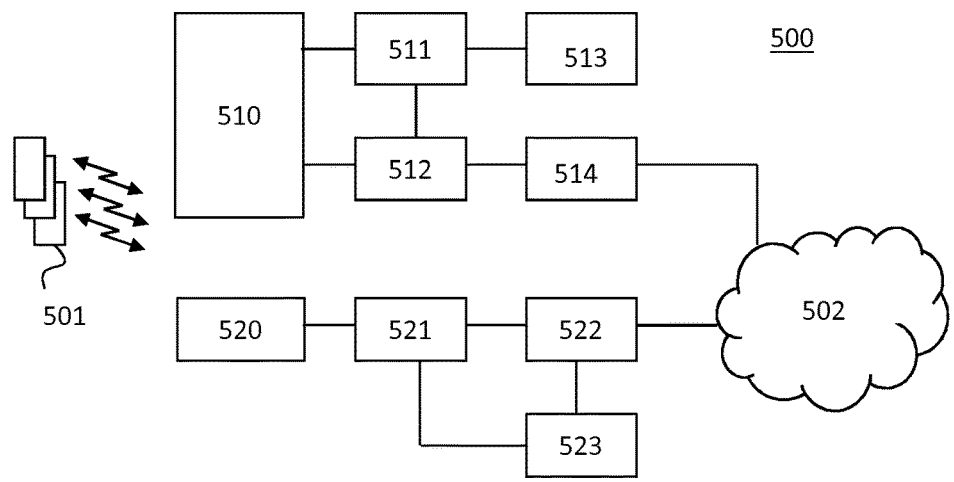
FIG. 12 is a block diagram of an exemplary cellular telecommunication system used in an embodiment of the device and the system of the invention.

In the telecommunications system 500 of FIG. 12, three generations of networks are schematically depicted together for purposes of brevity. A more detailed description of the architecture and overview can be found in 3GPP Technical Specification TS 23.002 'Network Architecture' which is included in the present application by reference in its entirety. Other types of cellular telecommunication system can alternatively or additionally be used, e.g. a 5G cellular telecommunication system.

The lower branch of FIG. 12 represents a GSM/GPRS or UMTS network.

For a GSM/GPRS network, a radio access network (RAN) system 520 comprises a plurality of nodes, including base stations (combination of a BSC and a BTS), not shown individually in FIG. 12. The core network system comprises a Gateway GPRS Support Node 522 (GGSN), a Serving GPRS Support Node 521 (SGSN, for GPRS) or Mobile Switching Centre (MSC, for GSM, not shown in FIG. 12) and a Home Location Register 523 (HLR). The HLR 523 contains subscription information for user devices 501, e.g. mobile stations MS.

For a UMTS radio access network (UTRAN), the radio access network system 520 also comprises a Radio Network Controller (RNC) connected to a plurality of base stations (NodeBs), also not shown individually in FIG. 12. In the core network system, the GGSN 522 and the SGSN 521/MSC are connected to the HLR 523 that contains subscription information of the user devices 501, e.g. user equipment UE.

The upper branch of the telecommunications system in FIG. 12 represents a next generation network, commonly indicated as Long Term Evolution (LTE) system or Evolved Packet System (EPS).

The radio access network system 510 (E-UTRAN), comprises base stations (evolved NodeBs, eNodeBs or eNBs), not shown individually in FIG. 12, providing cellular wireless access for a user device 501, e.g. user equipment UE. The core network system comprises a PDN Gateway (P-GW) 514 and a Serving Gateway 512 (S-GW). The E-UTRAN 510 of the EPS is connected to the S-GW 512 via a packet network. The S-GW 512 is connected to a Home Subscriber Server HSS 513 and a Mobility Management Entity MME 511 for signalling purposes. The HSS 513 includes a subscription profile repository SPR for user devices 501.

For GPRS, UMTS and LTE systems, the core network system is generally connected to a further packet network 502, e.g. the Internet.

Further information of the general architecture of an EPS network can be found in 3GPP Technical Specification TS 23.401 'GPRS enhancements for Evolved Universal Terrestrial Radio Access Network (E-UTRAN) access'.

Figure 13:
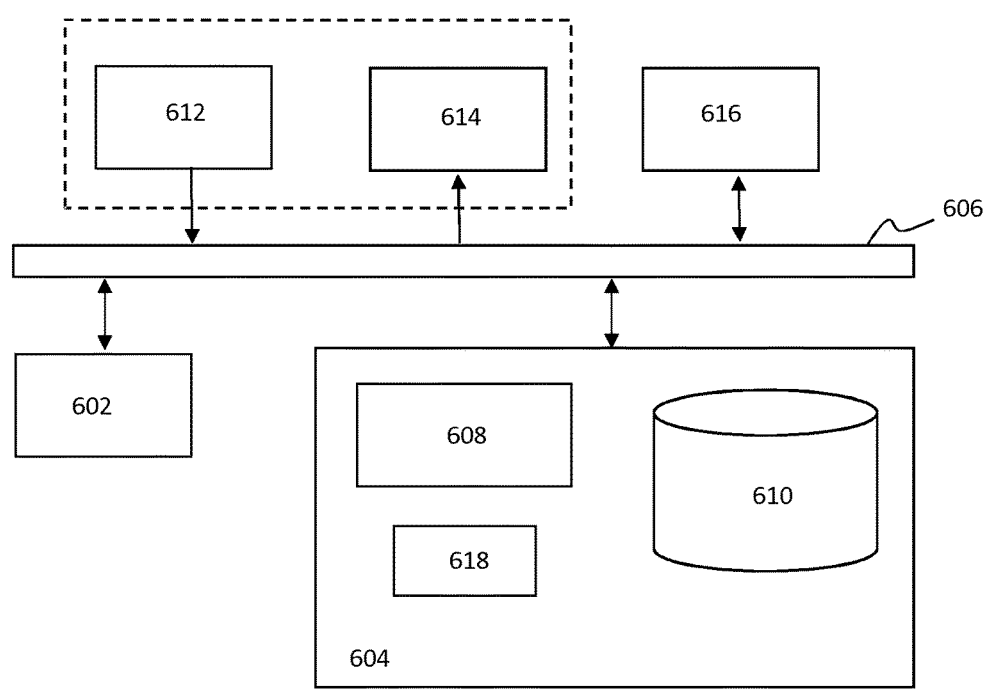
FIG. 13 is a block diagram of an exemplary data processing system for performing the method of the invention.

FIG. 13 depicts a block diagram illustrating an exemplary data processing system that may perform the methods as described with reference to FIGS. 2 to 4 and FIGS. 6 to 11.

As shown in FIG. 13, the data processing system 600 may include at least one processor 602 coupled to memory elements 604 through a system bus 606. As such, the data processing system may store program code within memory elements 604. Further, the processor 602 may execute the program code accessed from the memory elements 604 via a system bus 606. In one aspect, the data processing system may be implemented as a computer that is suitable for storing and/or executing program code. It should be appreciated, however, that the data processing system 600 may be implemented in the form of any system including a processor and a memory that is capable of performing the functions described within this specification.

The memory elements 604 may include one or more physical memory devices such as, for example, local memory 608 and one or more bulk storage devices 610. The local memory may refer to random access memory or other non-persistent memory device(s) generally used during actual execution of the program code. A bulk storage device may be implemented as a hard drive or other persistent data storage device. The processing system 600 may also include one or more cache memories (not shown) that provide temporary storage of at least some program code in order to reduce the number of times program code must be retrieved from the bulk storage device 610 during execution.

Input/output (I/O) devices depicted as an input device 612 and an output device 614 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 13 with a dashed line surrounding the input device 612 and the output device 614). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 616 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 600, and a data transmitter for transmitting data from the data processing system 600 to said systems, devices and/or networks. Modems, cable modems, and Ethernet cards are examples of different types of network adapter that may be used with the data processing system 600.

As pictured in FIG. 13, the memory elements 604 may store an application 618. In various embodiments, the application 618 may be stored in the local memory 608, he one or more bulk storage devices 610, or separate from the local memory and the bulk storage devices. It should be appreciated that the data processing system 600 may further execute an operating system (not shown in FIG. 13) that can facilitate execution of the application 618. The application 618, being implemented in the form of executable program code, can be executed by the data processing system 600, e.g., by the processor 602. Responsive to executing the application, the data processing system 600 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 602 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for receiving in a mobile communication network information that is encrypted, the system comprising:
   a communication interface; and
   at least one processor configured to:
      maintain a list of one or more devices associated with the system in a memory, wherein for each first device of the list which uses a second device of the list as a relay to the mobile communication network, a relation between the first device and the second device is recorded in the list and a security endpoint is recorded for the first device in the list,
      use the communication interface to receive the encrypted information from a given device,
      determine from the list whether the given device is used by a further device as a relay to the mobile communication network,
      use the communication interface to forward the encrypted information to the security endpoint associated with the further device upon determining that the given device is used by the further device as a relay to the mobile communication network and the security endpoint is not the system, and
      decrypt the encrypted information upon determining that the given device is not used by the further device as a relay to the mobile communication network.

2. The system of claim 1, wherein the at least one processor is configured to decrypt the encrypted information upon determining that the given device is used by the further device as a relay to the mobile communication network and the system is associated as the security endpoint with the further device.

3. The system of claim 1, wherein the at least one processor is configured to use the communication interface to connect to a particular second device which is used by a particular first device as a relay, the particular second device previously connecting to a further system, and to record in the list the further system as the security endpoint for the particular first device.

4. The system of claim 1, wherein the at least one processor is configured to use the communication interface to receive a notification that a particular first device is using or wants to use a particular second device connected to the system as a relay and if the particular first device previously used a third device as a relay and the third device was connected to a further system, to record in the list the further system as the security endpoint for the particular first device.

5. The system of claim 1, wherein the at least one processor is configured to use the communication interface to receive information identifying the security endpoint and to record the security endpoint for one or more devices associated with the system in the list.

6. The system of claim 5, wherein the security endpoint comprises a serving gateway.

7. The system of claim 6, wherein the at least one processor is configured to use the communication interface to receive information identifying a certain serving gateway for further devices that use a particular device as a relay to the mobile communication network from a mobility management function.

8. A method of receiving in a mobile communication network information that is encrypted, the method comprising:
   maintaining a list of one or more devices associated with a system of a mobile communication network, wherein for each first device of the list which uses a second device of the list as a relay to the mobile communication network, a relation between the first device and the second device is recorded in the list and a security endpoint is recorded for the first device in the list;
   receiving at the system the encrypted information from a given device;
   determining from the list whether the given device is used by a further device as a relay to the mobile communication network;
   forwarding the encrypted information to the security endpoint associated with the further device upon determining that the given device is used by the further device as a relay to the mobile communication network and the security endpoint is not the system; and decrypting the encrypted information upon determining that the given device is not used by the further device as a relay to the mobile communication network.

9. The method of claim 8, further comprising decrypting the encrypted information upon determining that the given device is used by the further device as a relay to the mobile communication network and the system is associated as the security endpoint with the further device.

10. The method of claim 8, further comprising connecting to a particular second device which is used by a particular first device as a relay, the particular second device previously connecting to a further system, and recording in the list the further system as the security endpoint for the particular first device.

11. The method of claim 8, further comprising receiving a notification that a particular first device is using or wants to use a particular second device connected to the system as a relay and upon determining that the particular first device previously used a third device as a relay and the third device was connected to a further system, recording in the list the further system as the security endpoint for the particular first device.

12. The method of claim 8, further comprising receiving information identifying the security endpoint and recording the security endpoint for one or more devices associated with the system in the list.

13. The method of claim 12, wherein the security endpoint comprises a serving gateway.

14. The method of claim 13, further comprising receiving information identifying a certain serving gateway for further devices that use a particular device as a relay to the mobile communication network from a mobility management function.

15. A non-transitory computer-readable medium having instructions stored thereon for receiving in a mobile communication network information that is encrypted, wherein the instructions, when executed by one or more processors, cause the one or more processors to carry out operations including:
  maintaining a list of one or more devices associated with a system of a mobile communication network, wherein for each first device of the list which uses a second device of the list as a relay to the mobile communication network, a relation between the first device and the second device is recorded in the list and a security endpoint is recorded for the first device in the list;
  receiving at the system the encrypted information from a given device;
  determining from the list whether the given device is used by a further device as a relay to the mobile communication network;
  forwarding the encrypted information to the security endpoint associated with the further device upon determining that the given device is used by the further device as a relay to the mobile communication network and the security endpoint is not the system; and
  decrypting the encrypted information upon determining that the given device is not used by the further device as a relay to the mobile communication network.

* * * * *